United States Patent
Park et al.

(10) Patent No.: US 12,494,483 B2
(45) Date of Patent: Dec. 9, 2025

(54) NEGATIVE ELECTRODE ACTIVE MATERIAL AND LITHIUM SECONDARY BATTERY COMPRISING THE SAME

(71) Applicant: LG Energy Solution, Ltd., Seoul (KR)

(72) Inventors: Sung-Bin Park, Daejeon (KR); Bo-Na Kim, Daejeon (KR); Dae-Hong Kim, Daejeon (KR); In-Sun Yoo, Daejeon (KR); Wang-Mo Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 891 days.

(21) Appl. No.: 17/431,380

(22) PCT Filed: Feb. 24, 2020

(86) PCT No.: PCT/KR2020/002644
§ 371 (c)(1),
(2) Date: Aug. 16, 2021

(87) PCT Pub. No.: WO2020/171676
PCT Pub. Date: Aug. 27, 2020

(65) Prior Publication Data
US 2022/0140329 A1 May 5, 2022

(30) Foreign Application Priority Data
Feb. 22, 2019 (KR) .................. 10-2019-0021445

(51) Int. Cl.
*H01M 4/485* (2010.01)
*H01M 4/02* (2006.01)
(Continued)

(52) U.S. Cl.
CPC ......... *H01M 4/485* (2013.01); *H01M 4/0471* (2013.01); *H01M 4/1391* (2013.01);
(Continued)

(58) Field of Classification Search
CPC ... H01M 2004/021–027; H01M 4/485; H01M 4/0471; H01M 4/1391; H01M 10/052
See application file for complete search history.

(56) References Cited

U.S. PATENT DOCUMENTS

2004/0013941 A1 1/2004 Kobayashi et al.
2012/0045687 A1 2/2012 Wang et al.
(Continued)

FOREIGN PATENT DOCUMENTS

CN 102376947 A 3/2012
CN 106415899 A 2/2017
(Continued)

OTHER PUBLICATIONS

USALCO, USALCO technical data sheet for rice grind grade ground alumium sulfate, accessed on Jun. 13, 2025.*
(Continued)

*Primary Examiner* — Jonathan G Leong
*Assistant Examiner* — Kan Luo
(74) *Attorney, Agent, or Firm* — Birch, Stewart, Kolasch & Birch, LLP (57) ABSTRACT

A negative electrode active material for a secondary battery and a lithium secondary battery including the same. The negative electrode active material for a secondary battery, includes lithium titanium-based composite particles comprising: a lithium titanium oxide represented by $Li_xTi_yO_z$, wherein x, y and z satisfy $0.1 \leq x \leq 4$, $1 \leq y \leq 5$ and $2 \leq z \leq 12$, Zr doped into the lithium titanium oxide; and an aluminum and sulfur containing compound coated on a surface of the lithium titanium oxide. The aluminum and sulfur containing compound is present in an amount of 0.4 mM to 0.9 mM based on 1M lithium titanium oxide.

17 Claims, 1 Drawing Sheet

(51) Int. Cl.
  *H01M 4/04* (2006.01)
  *H01M 4/1391* (2010.01)
  *H01M 10/052* (2010.01)

(52) U.S. Cl.
  CPC .... *H01M 10/052* (2013.01); *H01M 2004/021* (2013.01); *H01M 2004/027* (2013.01)

(56) References Cited

U.S. PATENT DOCUMENTS

| | | |
|---|---|---|
| 2013/0302690 A1 | 11/2013 | Kim et al. |
| 2014/0038058 A1 | 2/2014 | Holzapfel et al. |
| 2014/0312269 A1 | 10/2014 | Laumann et al. |
| 2016/0079594 A1 | 3/2016 | Choi et al. |
| 2016/0204433 A1 | 7/2016 | Takemoto et al. |
| 2018/0013128 A1 | 1/2018 | Lim et al. |
| 2018/0198155 A1 | 7/2018 | Park et al. |
| 2019/0088936 A1 | 3/2019 | Hong et al. |
| 2021/0020930 A1* | 1/2021 | Choi et al. ............ H01M 4/485 |

FOREIGN PATENT DOCUMENTS

| | | | |
|---|---|---|---|
| CN | 107210429 A | 9/2017 | |
| JP | 2004-327309 A | 11/2004 | |
| JP | 2005-108448 A | 4/2005 | |
| JP | 2014-511335 A | 5/2014 | |
| JP | 5524202 B2 | 6/2014 | |
| KR | 10-2013-0055080 A | 5/2013 | |
| KR | 10-2013-0076866 A | 7/2013 | |
| KR | 10-1282593 B1 | 7/2013 | |
| KR | 10-2014-0096136 A | 8/2014 | |
| KR | 10-2014-0137720 A | 12/2014 | |
| KR | 20170063372 A * | 6/2017 | ............ H01M 4/485 |
| KR | 10-2018-0011207 A | 1/2018 | |
| KR | 10-2018-0087225 A | 8/2018 | |
| WO | WO 2016/196688 A1 | 12/2016 | |

OTHER PUBLICATIONS

International Search Report for PCT/KR2020/002644 mailed on Jun. 18, 2020.

* cited by examiner

NEGATIVE ELECTRODE ACTIVE MATERIAL AND LITHIUM SECONDARY BATTERY COMPRISING THE SAME

TECHNICAL FIELD

The present disclosure relates to a negative electrode active material and a lithium secondary battery comprising the same, and more particularly, to a negative electrode active material with minimized increase in resistance during charging and discharging and a lithium secondary battery comprising the same.

The present application claims priority to Korean Patent Application No. 10-2019-0021445 filed in the Republic of Korea on Feb. 22, 2019, the disclosure of which is incorporated herein by reference.

BACKGROUND ART

With the increasing costs of energy sources due to the exhaust of fossil energy and the growing interest in environmental pollution, the demand for eco-friendly alternative energy sources is an essential prerequisite for future life.

As the application field has been extended to energy of mobile phones, camcorders, lap-top computers, and even electric vehicles, many efforts have been devoted to studying and developing electrochemical devices.

In this aspect, electrochemical devices are attracting more attention, and especially, development of rechargeable secondary batteries is the focus of attention, and more recently, in the development of batteries, new electrode and battery design for improving the capacity density and specific energy have been studied and developed.

Particularly, lithium secondary batteries are used as power sources for Electric Vehicles (EVs), Hybrid Electric Vehicles (HEVs) and micro Hybrid Electric Vehicles (u-HEVs) in recent years, and they are extending the range of application to supplementary power sources through grids.

The micro Hybrid Electric Vehicles partly use secondary batteries, and the development of 12V dual or 48V secondary batteries for micro Hybrid Electric Vehicles moves towards higher output performance.

Meanwhile, lithium titanium oxide provides efficiency that is nearly close to 100% in the first charge and discharge cycle, and does not form a thin film on the surface of the negative electrode by the electrolyte decomposition reaction due to its high driving voltage, and thus it is expected to use lithium titanium oxide as a high output negative electrode material.

Accordingly, it is essential to use lithium titanium oxide to achieve fast charge and discharge characteristics of 20 C or above, but the existing lithium titanium oxide cannot satisfy the corresponding output requirement.

Accordingly, there is still a need to develop lithium titanium oxide negative electrode materials for use in hybrid electric vehicle applications requiring high output characteristics.

DISCLOSURE

Technical Problem

Therefore, the present disclosure is directed to providing a negative electrode active material free of kinetic effect that can be used in 12V or 48V system applications.

The present disclosure is further directed to providing a lithium secondary battery comprising the negative electrode active material.

Technical Solution

To solve the above-described problem, according to an aspect of the present disclosure, there is provided a negative electrode active material of the following embodiments.

According to a first embodiment, there is provided a negative electrode active material for a secondary battery, comprising:

lithium titanium-based composite particles comprising:
a lithium titanium oxide represented by $Li_xTi_yO_z$, wherein x, y and z satisfy $0.1 \leq x \leq 4$, $1 \leq y \leq 5$ and $2 \leq z \leq 12$; Zr doped into the lithium titanium oxide; and
an aluminum and sulfur containing compound coated on a surface of the lithium titanium oxide,
wherein the aluminum and sulfur containing compound is present in an amount of 0.4 mM to 0.9 mM based on 1M lithium titanium oxide.

According to a second embodiment, in the first embodiment, the aluminum and sulfur containing compound may include at least one of $Al_2(SO_4)_3$ or $Al_2S_3$ combination thereof.

According to a third embodiment, in the first or second embodiment, an amount of the doped Zr in the lithium titanium oxide may be 500 ppm to 2000 ppm based on the weight of the lithium titanium oxide.

According to a fourth embodiment, in any one of the first to third embodiments, the lithium titanium-based composite particles may comprise at least one of primary particles or secondary particles formed by agglomeration of the primary particles.

According to a fifth embodiment, in the fourth embodiment, an average particle size (D50) of the primary particles may be equal to or less than 1 μm.

According to a sixth embodiment, in the fourth or fifth embodiment, an average particle size (D50) of the secondary particles may be 0.5 μm to 20 μm.

According to a seventh embodiment, in any one of the first to sixth embodiments, the aluminum and sulfur containing compound may be present in an amount of 0.5 mM to 0.8 mM based on 1M lithium titanium oxide.

According to an eighth embodiment, in any one of the first to seventh embodiments, the lithium titanium oxide may be further doped with at least one of aluminum or sulfur.

According to a ninth embodiment, there is provided a method for manufacturing a negative electrode active material for a secondary battery, comprising:

(a) mixing a lithium precursor, a titanium precursor and a Zr precursor to prepare a precursor mixture;
(b) thermally treating the precursor mixture at a temperature ranging from 700° C. to 1,100° C. to obtain a lithium titanium oxide; and
(c) mixing the lithium titanium oxide obtained after the thermal treatment with an aluminum and sulfur containing compound and thermally treating the mixture at a temperature ranging from 400° C. to 500° C. to obtain lithium titanium oxide surface-coated with the aluminum and sulfur containing compound,
wherein the an aluminum and sulfur containing compound is present in an amount of 0.4 mM to 0.9 mM based on 1M lithium titanium oxide.

According to a tenth embodiment, in the ninth embodiment, the lithium precursor may include at least one of $Li_2CO_3$, LiOH, LiF, $Li_2SO_4$, $LiNO_3$, or LiCl.

According to an eleventh embodiment, in the ninth or tenth embodiment, the titanium precursor may include at least one of $TiO_2$, $TiCl_4$, $TiOCH_2$, $TiOSO_4$, or $TiO(OH)_2$.

According to a twelfth embodiment, in any one of the ninth to eleventh embodiments, the Zr precursor may include at least one of $Zr(OH)_4$ or $ZrO_2$.

According to a thirteenth embodiment, in any one of the ninth to twelfth embodiments, the aluminum and sulfur containing compound may include at least one of $Al_2(SO_4)_3$ or $Al_2S_3$.

According to a fourteenth embodiment, in any one of the ninth to thirteenth embodiments, a temperature of the thermal treatment performed after mixing the lithium titanium oxide with the aluminum and sulfur containing compound may be 400° C. to 480° C., and the aluminum and sulfur containing compound may be present in an amount of 0.5 mM to 0.8 mM based on 1M lithium titanium oxide.

According to a fifteenth embodiment, in any one of the ninth to fourteenth embodiments, the thermal treatment temperature performed after mixing the lithium titanium oxide with the aluminum and sulfur containing compound may be 450° C., and the aluminum and sulfur containing compound may be present in an amount of 0.7 mM based on 1M lithium titanium oxide.

According to a sixteenth embodiment, there is a provided a lithium secondary battery, comprising:

a positive electrode comprising a positive electrode active material, a negative electrode comprising a negative electrode active material, a separator interposed between the positive electrode and the negative electrode, and an electrolyte solution, wherein the negative electrode active material is defined in any one of the first to eighth embodiments.

Advantageous Effects

The negative electrode active material according to an embodiment of the present disclosure comprises a lithium titanium-based composite including a predetermined amount of Al sulfide coated on the surface of lithium titanium oxide, so that lithium ions do not occupy the 8a site during high rate intercalation and thus there is no kinetic effect, thereby minimizing the resistance increase rate with the increasing charge rate.

As a result, the negative electrode active material according to an embodiment of the present disclosure may be used in 12V or 48V secondary battery system applications.

In addition, the negative electrode active material according to an embodiment of the present disclosure may be used in automobile battery applications requiring high output such as micro hybrid batteries.

BRIEF DESCRIPTION OF DRAWING

The accompanying drawing illustrates a preferred embodiment of the present disclosure, and together with the following detailed description, serves to provide a further understanding of the technical aspects of the present disclosure, and accordingly, the present disclosure should not be interpreted as being limited to the drawing.

DETAILED DESCRIPTION

Figure 1:
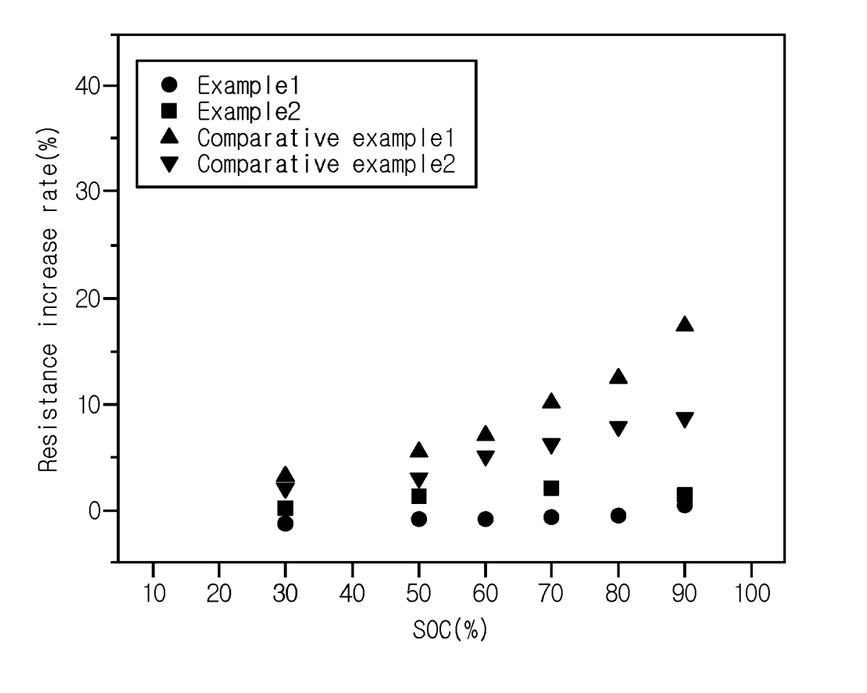
The FIGURE is a graph showing resistance increase rates of secondary batteries manufactured in examples 1 and 2 and comparative examples 1 and 2.

Hereinafter, the present disclosure will be described in detail. Prior to the description, the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description disclosed herein and illustration shown in the drawing are just a most preferable example, but not intended to fully describe the technical aspects of the present disclosure, so it should be understood that other equivalents and modifications could have been made thereto at the time of filing an application.

According to an aspect of the present disclosure, there is provided a negative electrode active material for a secondary battery comprising:

a lithium titanium-based composite comprising:
lithium titanium oxide (LTO) represented by the following chemical formula 1;
Zr doped into the lithium titanium oxide; and
Al sulfide coated on the surface of the lithium titanium oxide,
wherein the Al sulfide is present in an amount of 0.4 mM to 0.9 mM based on 1M lithium titanium oxide:

$Li_xTi_yO_z$  [Chemical formula 1]

where x, y and z satisfy 0.1≤x≤4, 1≤y≤5 and 2≤z≤12.

In general, a negative electrode for a high output secondary battery as an alternative to a carbon-based negative electrode is a negative electrode using lithium titanium oxide, and the lithium titanium oxide performs two phase reactions between a spinel structure and a rock salt structure by lithium intercalation and deintercalcation during charging and discharging. In this instance, due to the two phase reactions, even when resistance is measured at the same SOC, the resistance value may vary depending on a direction in which SOC is set (charging or discharging), and the resistance value may also vary depending on the charge rate.

The ununiform resistance value comes from the structural characteristics of lithium titanium oxide, i.e., intercalation and deintercalation of lithium ions through a phase change between a spinel structure and a rock salt structure, and this problem may make an estimation algorithm very complicated since estimation in a battery management system (BMS) is difficult when a lithium secondary battery using lithium titanium oxide as the negative electrode active material is used in a battery pack.

However, as in the present disclosure, with the negative electrode active material comprising a lithium titanium-based composite including lithium titanium oxide; Zr doped into the lithium titanium oxide; and Al sulfide coated on the surface of the lithium titanium oxide, the measured resistance value is uniformly low irrespective of the direction in which SOC is set and the charge rate, thereby overcoming the unique resistance difference resulting from the structural characteristics of lithium titanium oxide.

In the case of the common lithium titanium oxide, most of lithium ions intercalated during charging and discharging are located at the 8a site and their position is not reversibly changed, resulting in increased resistance.

The negative electrode active material comprising the lithium titanium-based composite of the present disclosure includes Al sulfide coated on the surface of the lithium titanium oxide to form an inter-diffusion layer on the surface, which increases energy for Li entering the 8a site, and thus lithium ions do not occupy the 8a tetrahedral sites of the lithium titanium oxide during high rate intercalation, and as a result, the position of lithium ions intercalated during charging and discharging may be reversibly changed. Lithium ions reversibly move between two sites of 8a and 16c, but when lithium migration to 8a is blocked, it is possible to overcome the unique resistance difference resulting from the structural characteristics of the lithium titanium oxide. Due to the absence of the kinetic effect, the negative electrode active material comprising the lithium titanium-based composite of the present disclosure may be easily used in 12V or 48V secondary battery system applications.

The lithium secondary battery according to the present disclosure that overcame the unique resistance difference resulting from the structural characteristics may have a minimum change in resistance, for example, 5% or lower, or 3% or lower in the range between SOC 5 and 100 during charging and discharging, irrespective of a direction in which resistance is measured.

In this instance, the kinetic effect is a difference in resistance between the pulse resistance measured after Li intercalation (charge) into LTO at low rate and the pulse resistance after intercalation (charge) at high rate.

The lithium titanium oxide may be, for example, $Li_{0.8}Ti_{2.2}O_4$, $Li_{2.67}T_{1.33}O_4$, $Li_{1.33}Ti_{1.67}O_4$, $Li_{1.14}Ti_{1.71}O_4$, $Li_4Ti_5O_{12}$, $LiTi_2O_4$ and $Li_2TiO_3$, and to be more specific, $Li_4Ti_5O_{12}$, $Li_{1.33}Ti_{1.67}O_4$ or $LiTi_2O_4$ with a small change in crystal structure during charging and discharging and a good spinel structure. However, the lithium titanium oxide is not limited thereto.

According to an embodiment of the present disclosure, the lithium titanium oxide may be in the form of either lithium titanium oxide primary particles or secondary particles formed by agglomeration of the primary particles, or a mixture of both.

Additionally, according to an embodiment of the present disclosure, the lithium titanium oxide may include lithium titanium oxide secondary particles and a small amount of unagglomerated free lithium titanium oxide primary particles, but the lithium titanium oxide may substantially be composed of secondary particles.

To obtain the lithium titanium oxide exhibiting high output characteristics, it is necessary to reduce the particle size and the grain size of the lithium titanium oxide primary particles.

When the particle size decreases with spaces being formed between the lithium titanium oxide primary particles, the distance of Li ions in the particles decreases and the reactive area of Li ions increases, resulting in significantly increased output characteristics.

The lithium titanium oxide particles may have the grain size of 100 nm to 200 nm, specifically 110 nm to 180 nm, and more specifically 140 nm to 160 nm.

When the grain size is smaller than 100 nm, a large number of grain boundaries is unfavorable for intercalation of lithium ions and the charge characteristics of the battery may degrade, and when the grain size is larger than 200 nm, diffusion of lithium ions in the grain is difficult, resulting in the increased resistance and reduced output.

The grain size of the lithium titanium oxide particles may be measured using the Rietveld refinement program Topaz. The grain size measurement method using the Topaz program may include methods commonly used in the technical field pertaining to the present disclosure.

In the lithium titanium-based composite of the present disclosure, the lithium titanium oxide is doped with Zr. The doped Zr makes diffusion of Li ions easy.

An amount of the doped Zr may be 500 to 2000 ppm, or 700 to 1500 ppm, or 900 to 1100 ppm based on the weight of the lithium titanium oxide. When the amount of the doped Zr satisfies the above range, the lattice constant may slightly increase and diffusion of Li ions may increase, thereby providing the lithium secondary battery having improved output characteristics.

The Al sulfide is coated on the surface of the lithium titanium oxide to form an inter-diffusion layer, which prevents Li occupancy in the 8a site during fast charging (Li intercalation).

The Al sulfide may include $Al_2(SO_4)_3$, $Al_2S_3$ or a combination thereof.

An amount of Al sulfide coated on the surface of the lithium titanium oxide is 0.4 mM to 0.9 mM, and to be specific, 0.5 mM to 0.8 mM, or 0.5 mM to 0.7 mM based on 1M lithium titanium oxide.

When the amount of Al sulfide is lower than 0.4 mM, the inter-diffusion layer is not sufficiently formed, failing to reduce the kinetic effect, and when the amount of Al sulfide is higher than 0.9 mM, the inter-diffusion layer increases in thickness and the side reaction layer (coating layer) on the surface increases in thickness, resulting in increased resistance and reduced capacity.

According to an embodiment of the present disclosure, the lithium titanium oxide may be further doped with Al, S (sulfur) or both. When the lithium titanium oxide is further doped with Al, S (sulfur) or both, the lattice constant for Li intercalation in the 8a site from the surface decreases, and Li cannot occupy the 8a site during high rate charging.

The lithium titanium-based composite may be primary particles, secondary particles formed by agglomeration of the primary particles, or a mixture of the primary particles and the secondary particles.

According to an embodiment of the present disclosure, the average particle size D50 of the primary particles may be equal to or smaller than 1 μm, and the average particle size D50 of the secondary particles may be 0.5 to 20 μm.

Here, D50 is the average particle size on the basis of particle volume, and refers to a particle size corresponding to 50% of the total volume accumulated from small particles, measured using a particle size distribution analyzer.

When the average particle size of the primary particles and the secondary particles satisfies the above range, the pellet density may increase and electrode processing may be improved. When the average particle size is too small, a large amount of conductive materials is needed, which makes it impossible to form an electrode, and when the average particle size is too large, the output may be reduced.

The primary particles and/or the secondary particles may have a spherical or quasi-spherical shape. And here, the quasi-spherical shape has a 3-dimensional volume including an oval shape, and includes particles of all shapes including amorphous particles having an indeterminate form.

Additionally, in an embodiment of the present disclosure, the negative electrode active material layer is a pore structure having a plurality of pores, and for example, the pore structure may come from at least one of characteristics of many shapes of the lithium titanium-based composite as described below.

The secondary particles of the lithium titanium-based composite have a porous structure in which pores are formed on the surface and inside the body of the secondary particles by the pores formed between the agglomerated primary particles. Additionally, the lithium titanium-based composite primary particles may have a porous structure in which a plurality of primary pores is formed on the surface and in the particle body. The pores are connected to one or more adjacent pores, thus serving as channels through which the electrolyte solution moves. Accordingly, the pores formed in the particles and connected with one another serve as channels through which the electrolyte solution moves.

The lithium titanium oxide included in the lithium titanium-based composite has spinel structures and provides 3-dimensional Li diffusion pathways, and thus is advantageous for fast charge and high output characteristics. Additionally, the lithium titanium oxide maintains the original crystal structure during charging and discharging and thus has high structural stability.

Additionally, the lithium titanium oxide may have capacity of 160 to 172 mAh/g, and preferably 165 to 170 mAh/g by lithiation.

Additionally, the lithium titanium oxide may produce lithium carbonate as a by-product in an amount of 0.5 weight % or less, or 0.2 weight % or less based on 100 weight % of the lithium titanium oxide.

According to an aspect of the present disclosure, there is provided a method for manufacturing a negative electrode active material for a secondary battery comprising:

(a) mixing a lithium precursor, a titanium precursor, and a Zr precursor to prepare a precursor mixture;
(b) thermally treating the precursor mixture at 700 to 1,100° C. to obtain lithium titanium oxide; and
(c) mixing the lithium titanium oxide obtained after the thermal treatment with Al sulfide and thermally treating the mixture at 400 to 500° C.,
wherein the Al sulfide is present in an amount of 0.4 mM to 0.9 mM based on 1M lithium titanium oxide.

In detail, an example of the method for manufacturing a negative electrode active material for a secondary battery according to the present disclosure may be as follows.

First, (a) the lithium precursor, the titanium precursor, and the Zr precursor are mixed to prepare the precursor mixture.

The mixing the precursor mixture in the step (a) is a process for uniformly mixing the lithium precursor, the titanium precursor and the Zr precursor, and the mixing method is not limited to a particular type and may include any mixing method for uniformly mixing the precursor mixture in a dry state, and may include a wet mixing method and a dry mixing method.

The mixing may use a wet mixing method, and when the wet mixing method using a spray drying process is taken as an example, the lithium precursor, the titanium precursor and the Zr precursor may be added to a solvent and stirred to uniformly mix them to prepare a precursor composition. The precursor composition may be injected into a chamber with a spray dryer, followed by solvent evaporation, to produce mixed precursor powder.

In detail, the precursor composition may be prepared by dissolving the lithium precursor and the titanium precursor in a solvent to prepare a composition and adding the Zr precursor while stirring the composition, and the used volatile solvent may include water, for example, deionized water or distilled water, alcohol having a small number of carbon atoms, for example, methanol, ethanol or propanol, or acetone, and any solvent that can be easily evaporated by heat applied during the spray drying may be used.

The prepared precursor composition may be injected into the chamber with the spray dryer as described above, and the precursor composition may be sprayed by the spray dryer, and at the same time, may be dried.

The spray dryer may include, for example, an ultrasonic spray dryer, an air nozzle spray dryer, an ultrasonic nozzle spray dryer, a filter expansion aerosol generator, an electrostatic spray dryer or a combination thereof. The spray drying may be preferably performed at the internal temperature of the chamber of 20 to 300° C., and when the temperature is higher than 300° C., there is a likelihood that particle agglomeration or particle growth of the mixed precursor powder may occur, thus requiring appropriate temperature control.

The mixing may use a dry mixing method, and the dry mixing method may include mixing the lithium precursor, the titanium precursor and the Zr precursor through a mechanical method, and for example, the mixing method may use a ball mill, a high speed rotary mill, a stirred mill, a jet mill or a combination thereof.

The lithium precursor is not limited to a particular type, and may include any source material that can supply lithium such as a lithium salt including a lithium ion and a salt, for example, $Li_2CO_3$, LiOH, LiF, $Li_2SO_4$, $LiNO_3$, LiCl or a combination thereof.

Additionally, the titanium precursor is not limited to a particular type and may include any type of source material that can supply titanium, such as an oxide of titanium, and the titanium precursor may be in the form of a hydrate and a dry powder. In this instance, when the titanium precursor is a hydrate, it may be desirable to mix the titanium precursor with the lithium precursor using a wet mixing method, and when the titanium precursor is a dry powder, it may be desirable to use a dry mixing method. The titanium precursor may include, for example, $TiO_2$, $TiCl_4$, $TiOCl_2$, $TiOSO_4$, $TiO(OH)_2$, or a combination thereof.

The Zr precursor may include $Zr(OH)_4$, $ZrO_2$, or a combination thereof.

Subsequently, (b) the precursor mixture is thermally treated at 700 to 1,100° C. to obtain lithium titanium oxide.

The step (b) may include thermally treating the precursor mixture, and may be a sintering process for thermally treating the mixed, dried precursor powder by any method to produce a lithium titanium oxide.

It may be necessary to appropriately control the thermal treatment temperature or time, and in the battery performance and safety aspects, it may be necessary to prevent the lithium precursor, the titanium precursor or the Zr precursor from staying unreacted, and to avoid by-products such as lithium salts produced by side reactions, it may be necessary to control the sintering condition.

The thermal treatment is performed at the temperature of 700 to 1,100° C., or about 750 to 1050° C., or 790 to 1000° C.

When the thermal treatment temperature is lower than 700° C. and enough heat is not supplied, the lithium salt such as the unreacted lithium precursor or the lithium compound caused by side reactions may remain in the lithium titanium oxide, and when there are a large amount of remaining impurities, side reactions or gas generation may occur and affect the storage performance or output characteristics of the battery, and when the thermal treatment temperature is higher than 1,100° C., lithium titanium oxide degradation or particle growth may occur due to excess energy supply and affect the output characteristics of the battery. Accordingly, it may be necessary to appropriately control the thermal treatment temperature.

It may be also necessary to control the thermal treatment time, and in the present disclosure, the thermal treatment may be preferably performed for about 2 to 12 hours, or 5 to 10 hours. When the thermal treatment time is satisfied, it is possible to ensure structural stability through sufficient grain growth and avoid unnecessary energy waste or process cost consumption.

Subsequently, (c) the lithium titanium oxide obtained after the thermal treatment is mixed with the Al sulfide and the mixture is thermally treated at 400 to 500° C.

The mixing of the lithium titanium oxide obtained after the thermal treatment with the Al sulfide may use, without limitation, any method commonly used to form a coating layer, and as described above, wet mixing or dry mixing may be used.

For example, Al sulfide may be mixed with a dispersion medium, and the mixture may be added to the lithium titanium oxide obtained after the thermal treatment and stirred and mixed to prepare a composition. Subsequently, the prepared composition may be dried, and put into, for example, a chamber with a spray dryer, followed by solvent evaporation, to prepare a mixed precursor powder. In this instance, the spray dryer is as described above.

Subsequently, the drying result is thermally treated at 400 to 500° C., or may be thermally treated at 400 to 480° C., or 400 to 450° C. When the thermal treatment temperature is outside of the above condition, coating is not achieved, or doping is performed without forming an inter-diffusion layer.

Additionally, as described above, the Al sulfide coated on the surface of the lithium titanium oxide is present in an amount of 0.4 mM to 0.9 mM based on 1M lithium titanium oxide, and to be specific, may be present in an amount of 0.5 mM to 0.8 mM, or 0.5 mM to 0.7 mM.

In an embodiment of the present disclosure, a loading amount of the negative electrode active material on the negative electrode may be 0.2 mAh/cm$^2$ to 2 mAh/cm$^2$.

According to a particular embodiment of the present disclosure, the negative electrode active material layer may further include a binder resin and a conductive material. Here, the negative electrode active material layer may include the negative electrode active material:the conductive material:the binder resin at a weight ratio of 80 to 90:7 to 13:3 to 9.

Additionally, in addition to the lithium titanium oxide, the negative electrode active material layer may further include, as the negative electrode active material, particles of at least one active material selected from the group consisting of carbonaceous materials such as natural graphite, artificial graphite; metals (Me) including Si, Sn, Li, Zn, Mg, Cd, Ce, Ni or Fe; alloys of the metals (Me); oxides (MeOx) of the metals (Me); and composites of the metals (Me) and carbon, commonly used as negative electrode active materials.

Non-limiting examples of the binder resin may include at least one selected from polyvinylidene fluoride-co-hexafluoropropylene, polytetrafluoroethylene (PTFE), polyvinylidene fluoride (PVDF), carboxy methylcellulose (CMC), polyvinyl alcohol (PVA), polyvinyl butyral (PVB), poly-N-vinylpyrrolidone (PVP), styrene butadiene rubber (SBR), polyamide-imide and polyimide, but is not limited thereto.

The conductive material is not limited to a particular type and may include any electron conducting material that does not cause a chemical change, for example, natural graphite, artificial graphite, carbon black, acetylene black, ketjen black, Super-P black, a carbon fiber, a metal powder or a metal fiber of copper, nickel, aluminum, silver.

In a particular embodiment of the present disclosure, the negative electrode may be manufactured by the following method. First, a negative electrode active material, a binder resin and a conductive material are dispersed in an appropriate solvent such as an organic solvent, for example, ethanol (EtOH), acetone, isopropyl alcohol, N-methylpyrrolidone (NMP) and propyleneglycol (PG), or water to prepare a negative electrode slurry, the negative electrode slurry is pressed into an electrode shape, or the slurry is coated on a metal foil into an electrode shape, or the composition for the negative electrode is pressed using rollers into a sheet state and attached to a metal foil into an electrode, and the result formed into an electrode shape is dried at the temperature of 100° C. to 350° C. to form the negative electrode. Describing an example of forming the negative electrode in more detail, the negative electrode slurry may be formed by pressing using a roll press forming machine. The roll press forming machine is designed to improve the electrode density and control the electrode thickness through pressing, and includes top and bottom rolls, a controller to control the roll thickness and the heating temperature, and a winding unit to wind and unwind the electrode. The electrode wound in a roll form is pressed while passing through the roll press, and wound again in a roll form to complete the electrode. In this instance, the applied pressure by the press is preferably 5 to 20 ton/cm$^2$, and the temperature of the roll is preferably 0 to 150° C. After the slurry undergoes the roll pressing process, the slurry undergoes drying. The drying process is performed at the temperature of 100° C. to 350° C., and preferably 150° C. to 300° C. In this instance, when the drying temperature is lower than 100° C., solvent evaporation is difficult, and when drying is performed at high temperature above 350° C., oxidization of the conductive material may occur. Accordingly, preferably, the drying temperature is equal to or higher than 100° C., and does not exceed 350° C. Additionally, the drying process is preferably performed at the above-described temperature for about 10 minutes to 6 hours. The drying process may hold powder particles together while drying (solvent evaporation) the formed composition for the negative electrode, thereby improving the strength of the negative electrode.

The lithium secondary battery of the present disclosure includes the above-described negative electrode and a positive electrode, a separator interposed between the positive electrode and the negative electrode, and an electrolyte solution.

The positive electrode may be manufactured by binding a positive electrode active material to a positive electrode current collector by a common method known in the technical field pertaining to the present disclosure. Non-limiting examples of the positive electrode active material may include positive electrode active materials commonly used in positive electrodes of electrochemical devices, and preferably, lithium manganese oxide, lithium cobalt oxide, lithium nickel oxide, lithium iron oxide or their lithium composite oxide. Non-limiting examples of the positive electrode current collector may include a foil made of aluminum, nickel or a combination thereof.

The separator may include a porous substrate having a plurality of pores, alone or in combination with a porous coating layer including inorganic particles and a binder polymer, coated on at least one surface of the porous substrate.

The porous substrate may be a porous polymer substrate, and to be specific, may be a porous polymer film substrate or a porous polymer nonwoven substrate.

The porous polymer film substrate may be a porous polymer film made of polyolefin such as polyethylene and polypropylene, and the polyolefin porous polymer film substrate exhibits a shutdown function, for example, at the temperature of 80 to 130° C.

Additionally, the porous polymer film substrate may be produced by forming in the shape of a film using various types of polymers such as polyolefin as well as polyester. Additionally, the porous polymer film substrate may be formed by stacking two or more film layers, and each film layer may be formed from polymer such as polyolefin and polyester as described above, used singly or in combination.

Additionally, in addition to the above-described polyolefins, the porous polymer film substrate and the porous nonwoven substrate may be formed from polyethyleneterephthalate, polybutyleneterephthalate, polyester, polyacetal, polyamide, polycarbonate, polyimide, polyetheretherketone, polyethersulfone, polyphenyleneoxide, polyphenylenesulfide and polyethylenenaphthalate, used singly or in combination. The thickness of the porous substrate is not particularly limited, but is preferably 1 to 100 µm, and more preferably 5 to 50 µm, and the pore size and porosity of the porous substrate are not particularly limited, but the pore size is preferably 0.01 to 50 µm and the porosity is preferably 10 to 95%.

In the separator according to an aspect of the present disclosure, the binder polymer used to form the porous coating layer may include polymers commonly used to form the porous coating layer in the technical field pertaining to the present disclosure. Particularly, polymer having the glass transition temperature $T_g$ of −200 to 200° C. may be used to improve the mechanical properties of the finally formed porous coating layer such as flexibility and elasticity. The binder polymer faithfully serves as a binder to connect and stably immobilize the inorganic particles, contributing to the prevention of mechanical property degradation in the separator having the porous coating layer.

Additionally, the binder polymer does not need to be capable of transporting ions, but the use of polymer capable of transporting ions may further improve the performance of electrochemical devices. Accordingly, the binder polymer may include those having as high a dielectric constant as possible. The dissolution rate of salt in the electrolyte solution relies on the dielectric constant of the electrolyte solution solvent, and as the dielectric constant of the binder polymer increases, the dissociation rate of salt in the electrolyte may increase. The dielectric constant of the binder polymer may range between 1.0 and 100 (measured in frequency=1 kHz), and to be specific, 10 or above.

In addition to the above-described function, the binder polymer may show a high degree of swelling in the electrolyte solution by gelation when impregnated with the liquid electrolyte solution. Accordingly, the solubility parameter of the binder polymer, i.e., the Hildebrand solubility parameter ranges between 15 and 45 $MPa^{1/2}$ or between 15 and 25 $MPa^{1/2}$ or between 30 and 45 $MPa^{1/2}$. Accordingly, hydrophilic polymers having polar groups, rather than hydrophobic polymers such as polyolefins, may be used. When the solubility parameter is lower than 15 $MPa^{1/2}$ and higher than 45 $MPa^{1/2}$, the binder polymer may not swell in general liquid electrolyte solutions for batteries.

Non-limiting examples of the binder polymer may include polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan and carboxyl methylcellulose, but is not limited thereto.

For example, a weight ratio of the inorganic particles and the binder polymer preferably ranges between 50:50 and 99:1, and more preferably between 70:30 and 95:5. When the ratio of the inorganic particles to the binder polymer satisfies the above range, it is possible to prevent reduction in the pore size and the porosity of the formed coating layer caused by the high amount of the binder polymer, and reduction in the peel resistance of the formed coating layer caused by the low amount of the binder polymer.

In the porous coating layer, the inorganic particles are packed in contact such that the inorganic particles are held together by the binder polymer, thus forming interstitial volumes therebetween, and the interstitial volumes are empty spaces that are to be pores.

That is, the binder polymer may bind the inorganic particles to hold them together, and for example, the binder polymer adheres and immobilizes the inorganic particles. Additionally, interstitial volumes between the inorganic particles are empty spaces that are to be the pores of the porous coating layer, and they are spaces defined by the inorganic particles substantially in surface contact in the closely packed or densely packed structure by the inorganic particles.

The inorganic particles are selected from the group consisting of inorganic particles having the dielectric constant of about 5 or more, inorganic particles capable of transporting lithium ions and a combination thereof.

According to an embodiment of the present disclosure, the electrolyte solution includes a salt having a structure represented by, for example, $A^+B^-$. Here, $A^+$ includes an alkali metal cation such as $Li^+$, $Na^+$, $K^+$ or a combination thereof, and preferably $Li^+$ ion. $B^-$ includes an anion such as $F^-$, $Cl^-$, $Br^-$, $I^-$, $NO_3^-$, $BF_4^-$, $PF_6^-$, $N(CN)_2^-$, $SCN^-$, $ClO_4^-$, $AsF_6^-$, $CF_3SO_3^-$, $(CF_3SO_2)_2^-$, $C(CF_2SO_2)_3^-$, $(CF_3)_3PF_3^-$, $(CF_3)_4PF_2^-$, $(CF_3)_5PF^-$, $(CF_3)_6P^-$, $(CF_3CF_2SO_2)_2N^-$, $(CF_3SO_2)$ $2N^-$, $CF_3SO_3^-$, $CF_3CF_2(CF_3)_2CO^-$, $(CF_3SO_2)$ $_2CH^-$, $(CF_3SO_2)_3C^-$, $CF_3(CF_2)_7SO_3^-$, $CF_3CO_2^-$, $CH_3CO_2^-$ or a combination thereof. Preferably, the salt of the $A^+B^-$ structure is a lithium salt.

The salt of the $A^+B^-$ structure is dissolved and dissociated in an organic solvent. Non-limiting examples of the organic solvent may include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or a combination thereof.

The pouring of the electrolyte solution may be performed in any suitable step of the battery manufacturing process according to the manufacturing process and the required properties of a final product. That is, the pouring of the electrolyte solution may be applied before battery assembly or in the final step of battery assembly.

According to an aspect of the present disclosure, there are provided a battery module including the lithium secondary battery as a unit battery and a battery pack including the battery module.

The lithium secondary battery of the present disclosure uses lithium titanium-based composite as the negative electrode active material to achieve the improved output characteristics without actually causing a reduction in high temperature characteristics and battery capacity as described above, when the lithium secondary battery is used in place of or in addition to an automobile lead-acid battery, it is possible to provide the battery pack with improved efficiency.

The battery pack may include lithium secondary batteries connected in series, or may include lithium secondary battery modules connected in series, each lithium secondary battery module including lithium secondary batteries connected in parallel.

The battery pack may be used as a power source of devices requiring high temperature stability, long cycle characteristics and high rate characteristics. For example, the device may include, but is not limited to, power tools; vehicles including Electric Vehicles (EVs), micro Hybrid Electric Vehicles (u-HEVs), Hybrid Electric Vehicles (HEVs) and Plug-in Hybrid Electric Vehicles (PHEVs); electric two wheelers including E-bike and E-scooters; electric golf carts; and energy storage systems, which are powered on and work by power from an electric motor.

Hereinafter, the present disclosure will be described in detail by way of examples. However, the examples of the present disclosure may be modified in many other forms, and the scope of the present disclosure should not be construed as being limited to the following examples. The examples of the present disclosure are provided to fully explain the present disclosure to those having ordinary knowledge in the art to which the present disclosure pertains.

Example 1

42.8 parts by weight of $Li_2CO_3$ as a lithium precursor and 57.2 parts by weight of $TiO_2$ as a titanium precursor are mixed with 50 parts by weight of water, and put into a ball mill in which the mixture is milled and stirred for 60 minutes to ensure uniform mixing, and subsequently, $Zr(OH)_4$ as a Zr precursor is added at the concentration of 1,000 ppm based on the weight of lithium titanium oxide to prepare a precursor composition. The prepared precursor composition is spray dried to obtain a spheroidized precursor, and the spheroidized precursor is thermally treated in a furnace at the temperature of 790° C. for 10 hours to obtain lithium titanium oxide ($Li_4Ti_5O_{12}$). The obtained lithium titanium oxide ($Li_4Ti_5O_{12}$) and water are used at a weight ratio of 1:1 to prepare a 1M lithium titanium oxide ($Li_4Ti_5O_{12}$) aqueous solution, and 0.7 mM of $Al_2(SO_4)_3$ is added thereto, followed by stirring using a stirrer and spray drying, to obtain a mixture. The obtained mixture is thermally treated in the furnace at the temperature of 450° C. for 5 hours to prepare a lithium titanium-based composite. In this instance, the obtained lithium titanium-based composite is secondary particles having the average particle size D50 of 16 μm. The prepared lithium titanium-based composite includes Al sulfide coated on the surface of the lithium titanium oxide, and the Al sulfide is present in an amount of 0.7 mM based on 1M lithium titanium oxide. An amount of the doped Zr is 1,000 ppm based on the weight of the lithium titanium oxide.

92 weight % of the synthesized lithium titanium-based composite, 4 weight % of carbon black as a conductive material and 4 weight % of polyvinylidene fluoride (PVdF) as a binder are added to N-methyl-2-pyrrolidone (NMP) as a solvent to prepare a negative electrode mixture slurry. The prepared negative electrode mixture slurry is coated on one surface of an aluminum (Al) thin film having the thickness of about 20 μm as a negative electrode current collector, followed by drying and roll pressing, to manufacture a negative electrode having an active material layer with the porosity of approximately 33%.
<Manufacture of Positive Electrode>
96 weight % of a mixture of $LiMn_2O_4$ and $Li(Ni_{0.33}Co_{0.33}Mn_{0.33})O_2$ as a positive electrode active material, 2 weight % of carbon black as a conductive material and 2 weight % of polyvinylidene fluoride (PVdF) as a binder are added to N-methyl-2-pyrrolidone (NMP) as a solvent to prepare a positive electrode mixture slurry. The positive electrode mixture slurry is coated on one surface of an aluminum (Al) thin film having the thickness of about 20 μm as a positive electrode current collector, followed by drying and roll pressing, to manufacture a positive electrode.
<Manufacture of Lithium Secondary Battery>
A lithium secondary battery is manufactured using the above-described positive and negative electrodes by a common method, together with a separator of polypropylene/polyethylene/polypropylene (PP/PE/PP) triple layer structure, followed by injection of an electrolyte containing 1M $LiPF_6$ dissolved in a mixed solvent of ethylene carbonate (EC) and diethyl carbonate (DEC) at a volume ratio of 30:70.
<Manufacture of Half Cell>
A half cell is manufactured as follows.
0.4 g of a binder solution containing 5 wt % of polyvinylidene fluoride (PVdF) dissolved in N-methylpyrrolidone (NMP) is added to 0.98 g of the prepared lithium titanium-based composite, and mechanically stirred to prepare a slurry (a weight ratio of LTO-A:PVdF is 98:2).

The slurry is coated on an aluminum foil to the thickness of 90 μm and dried in a vacuum at 120° C. to manufacture a negative electrode.

Subsequently, the negative electrode is wound into a round shape with the diameter of 12 mm, and a 2032 type coin half cell is manufactured using a lithium metal (foil) as a counter electrode. In this instance, an electrolyte solution used is a solution of 1.3M $LiPF_6$ dissolved in a mixed solvent of ethylene carbonate, diethyl carbonate and methylethyl carbonate at a volume ratio of 3:5:2.

Example 2

The obtained lithium titanium oxide ($Li_4Ti_5O_{12}$) and water are used at a weight ratio of 1:1 to prepare a 1M lithium titanium oxide ($Li_4Ti_5O_{12}$) aqueous solution, and 0.5 mM of $Al_2(SO_4)_3$ is added thereto, followed by stirred using a stirrer and spray drying, to obtain a mixture, and the mixture is thermally treated in a furnace at the temperature of 400° C. for 5 hours. Except for the foregoing, a negative electrode and a secondary battery are manufactured by the same method as example 1.

The prepared lithium titanium-based composite includes Al sulfide coated on the surface of the lithium titanium oxide, and the Al sulfide is present in an amount of 0.5 mM based on 1M lithium titanium oxide.

Comparative Example 1

The step of adding the obtained lithium titanium oxide ($Li_4Ti_5O_{12}$) to the $Al_2(SO_4)_3$ aqueous solution and spray drying, i.e., coating $Al_2(SO_4)_3$ on the lithium titanium oxide ($Li_4Ti_5O_{12}$) is not performed. Except for the foregoing, a negative electrode and a secondary battery are manufactured by the same method as example 1.

Comparative Example 2

The obtained lithium titanium oxide ($Li_4Ti_5O_{12}$) and water are used at a weight ratio of 1:1 to prepare a 1M lithium titanium oxide ($Li_4Ti_5O_{12}$) aqueous solution, and 0.3 mM of $Al_2(SO_4)_3$ is added thereto, followed by stirring using a stirrer and spray drying, to obtain a mixture, and the mixture is thermally treated in a furnace at the temperature of 400° C. for 5 hours. Except for the foregoing, a negative electrode and a secondary battery are manufactured by the same method as example 1. The prepared lithium titanium-based composite includes Al sulfide coated on the surface of the lithium titanium oxide, and the Al sulfide is present in an amount of 0.3 mM based on 1M lithium titanium oxide.

Comparative Example 3

The obtained lithium titanium oxide ($Li_4Ti_5O_{12}$) and water are used at a weight ratio of 1:1 to prepare a 1M lithium titanium oxide ($Li_4Ti_5O_{12}$) aqueous solution, and 1.0 mM of $Al_2(SO_4)_3$ is added thereto, followed by stirring using a stirrer and spray drying, to obtain a mixture, and the mixture is thermally treated in a furnace at the temperature of 450° C. for 5 hours. Except for the foregoing, a negative electrode and a secondary battery are manufactured by the same method as example 1.

The prepared lithium titanium-based composite includes Al sulfide coated on the surface of the lithium titanium oxide, and the Al sulfide is present in an amount of 1.0 mM based on 1 M lithium titanium oxide.

Comparative Example 4

The obtained lithium titanium oxide ($Li_4Ti_5O_{12}$) and water are used at a weight ratio of 1:1 to prepare a 1M lithium titanium oxide ($Li_4Ti_5O_{12}$) aqueous solution, and 0.2 mM of trimethylaluminum (TMA) is added thereto, followed by stirring using a stirrer and spray drying, to obtain a mixture, and the mixture is thermally treated in a furnace at the temperature of 450° C. for 5 hours. Except for the foregoing, a negative electrode and a secondary battery are manufactured by the same method as example 1.
Measurement of Characteristics
Memory Effect (Kinetic Effect) Evaluation (1) Evaluation of Examples 1 to 2 and Comparative Examples 1 to 2

The secondary batteries manufactured in examples 1 to 2 and comparative examples 1 to 2 are charged at 1 C, 25° C. to SOC 20%, and then charged at 1 C to the target SOC, and subsequently charged at 35 C, and charge resistance 1 is measured.

Additionally, the secondary batteries manufactured in examples 1 to 2 and comparative examples 1 to 2 are charged at 1 C, 25° C. to SOC 20%, and then charged at 10 C to the target SOC, and subsequently charged at 35 C, and charge resistance 2 is measured.

The resistance increase rate (%) is calculated by the following equation using the measured charge resistance 1 and charge resistance 2.

Resistance increase rate (%)=(charge resistance 2−charge resistance 1)/(charge resistance 1)×100

The resistance increase rates of the secondary batteries manufactured in examples 1 to 2 and comparative examples 1 to 2 are measured with changing the target SOC to 30%, 50%, 60%, 70%, 80%, 90%, and the results are shown in Table 1 and the FIGURE.

(2) Evaluation of Comparative Examples 3 and 4

The secondary battery of comparative example 3 includes a larger amount of Al sulfide than the threshold, coated on the surface of the lithium titanium oxide, and capacity is too low to evaluate the resistance.

The resistance increase rate (%) of the secondary battery of comparative example 4 is calculated by the above equation using charge resistance 1 and charge resistance 2 only at SOC 90%, and the results are shown in Table 1. The measurements are not made at other SOCs.

TABLE 1

|  | Resistance increase rate (%) as a function of SOC (%) | | | | | |
| --- | --- | --- | --- | --- | --- | --- |
|  | SOC 30% | SOC 50% | SOC 60% | SOC 70% | SOC 80% | SOC 90% |
| Example 1 | −1.3 | −0.9 | −0.9 | −0.7 | −0.7 | 0.4 |
| Example 2 | 0.2 | 1.5 | — | 2.1 | — | 1.4 |
| Comparative example 1 | 3.3 | 5.6 | 7.5 | 10.2 | 12.5 | 17.2 |
| Comparative example 2 | 2.0 | 2.8 | 5.1 | 6.1 | 7.9 | 8.6 |
| Comparative example 4 | — | — | — | — | — | 120 |

Referring to Table 1 and the FIGURE, it can be seen that when comparing with comparative examples 1, 2 and 4, the secondary batteries of examples 1 and 2 have a very low resistance increase rate despite the increasing SOC (%). It is understood that the negative electrode active material used in the secondary batteries of examples 1 and 2 comprises the lithium titanium-based composite including the predetermined amount of Al sulfide coated on the surface of the lithium titanium oxide, so that lithium ions do not occupy the 8a site during high rate intercalation, and thus there is no kinetic effect, thereby minimizing the resistance increase rate with the increasing charge rate.

What is claimed is:
1. A negative electrode active material for a secondary battery, comprising:
 lithium titanium-based composite particles comprising:
 a lithium titanium oxide represented by $Li_xTi_yO_z$, wherein x, y and z satisfy 0.1≤x≤4, 1≤y≤5 and 2≤z≤12;
 Zr doped into the lithium titanium oxide; and
 an aluminum and sulfur containing compound coated on a surface of the lithium titanium oxide,
 wherein the aluminum and sulfur containing compound is present in an amount of 0.4 mM to 0.9 mM based on 1M lithium titanium oxide,
 wherein the aluminum and sulfur containing compound coated on the surface of the lithium titanium oxide forms an inter-diffusion layer on the surface, the inter-diffusion layer configured to block lithium ions from entering an 8a tetrahedral site of the lithium titanium oxide during high rate intercalation, and
 wherein the inter-diffusion layer comprises $Al_2S_3$.
2. The negative electrode active material for the secondary battery according to claim 1, wherein an amount of the doped Zr in the lithium titanium oxide is 500 ppm to 2000 ppm based on a weight of the lithium titanium oxide.
3. The negative electrode active material for the secondary battery according to claim 1, wherein the lithium titanium-based composite particles comprise at least one of primary particles or secondary particles formed by agglomeration of primary particles.

4. The negative electrode active material for the secondary battery according to claim 3, wherein an average particle size (D50) of the primary particles is equal to or less than 1 μm.

5. The negative electrode active material for the secondary battery according to claim 3, wherein an average particle size (D50) of the secondary particles is 0.5 μm to 20 μm.

6. The negative electrode active material for the secondary battery according to claim 1, wherein the aluminum and sulfur containing compound is present in an amount of 0.5 mM to 0.8 mM based on 1M lithium titanium oxide.

7. The negative electrode active material for the secondary battery according to claim 1, wherein the lithium titanium oxide is further doped with at least one of aluminum or sulfur.

8. A lithium secondary battery, comprising:
a positive electrode comprising:
a positive electrode active material;
a negative electrode comprising a negative electrode active material;
a separator interposed between the positive electrode and the negative electrode; and
an electrolyte solution,
wherein the negative electrode active material is defined in claim 1.

9. The negative electrode active material for the secondary battery according to claim 1, wherein the aluminum and sulfur containing compound is present in an amount of 0.5 mM to 0.7 mM based on 1M lithium titanium oxide.

10. The negative electrode active material for the secondary battery according to claim 1, wherein the lithium titanium oxide is further doped with sulfur.

11. A method for manufacturing the negative electrode active material for a secondary battery according to claim 1 comprising:
(a) mixing a lithium precursor, a titanium precursor and a Zr precursor to prepare a precursor mixture;
(b) thermally treating the precursor mixture at a temperature ranging from 700° C. to 1,100° C. to obtain a lithium titanium oxide; and
(c) mixing the lithium titanium oxide obtained after the thermal treatment with an aluminum and sulfur containing compound and thermally treating the mixture at a temperature ranging from 400° C. to 500° C. to obtain lithium titanium oxide surface-coated with the aluminum and sulfur containing compound,
wherein the aluminum and sulfur containing compound is present in an amount of 0.4 mM to 0.9 mM based on 1M lithium titanium oxide.

12. The method for manufacturing the negative electrode active material for the secondary battery according to claim 11, wherein the lithium precursor comprises at least one of $Li_2CO_3$, LiOH, LiF, $Li_2SO_4$, $LiNO_3$, or LiCl.

13. The method for manufacturing the negative electrode active material for the secondary battery according to claim 11, wherein the titanium precursor comprises at least one of $TiO_2$, $TiCl_4$, $TiOCl_2$, $TiOSO_4$, or $TiO(OH)_2$.

14. The method for manufacturing the negative electrode active material for the secondary battery according to claim 11, wherein the Zr precursor comprises at least one of $Zr(OH)_4$ or $ZrO_2$.

15. The method for manufacturing the negative electrode active material for the secondary battery according to claim 11, wherein the aluminum and sulfur containing compound comprises at least one of $Al_2(SO_4)_3$ or $Al_2S_3$.

16. The method for manufacturing the negative electrode active material for the secondary battery according to claim 11, wherein the temperature of the thermal treatment performed after mixing the lithium titanium oxide with the aluminum and sulfur containing compound is 400° C. to 480° C., and the aluminum and sulfur containing compound is present in an amount of 0.5 mM to 0.8 mM based on 1M lithium titanium oxide.

17. The method for manufacturing the negative electrode active material for the secondary battery according to claim 11, wherein the thermal treatment temperature performed after mixing the lithium titanium oxide with the aluminum and sulfur containing compound is 450° C., and the aluminum and sulfur containing compound is present in an amount of 0.7 mM based on 1M lithium titanium oxide.

* * * * *